United States Patent [19]

Franklin

[11] Patent Number: 4,671,101
[45] Date of Patent: Jun. 9, 1987

[54] PACKAGE HANDLING APPARATUS AND METHOD

[75] Inventor: Kenneth W. Franklin, Knightcote, near Leamington Spa, United Kingdom

[73] Assignee: Bishopbarn Limited, Leamington Spa, England

[21] Appl. No.: 599,327

[22] Filed: Apr. 12, 1984

[30] Foreign Application Priority Data

Apr. 16, 1983 [GB] United Kingdom ............ 8310367

[51] Int. Cl.⁴ .......................................... G01M 3/36
[52] U.S. Cl. .................................. 73/49.3; 73/45.4; 209/599
[58] Field of Search ............ 73/52, 49.2, 49.3, 45.4, 73/41, 41.3; 209/599, 698, 941; 221/211

[56] References Cited

U.S. PATENT DOCUMENTS

| 3,542,241 | 11/1970 | Middleditch ................ 221/211 |
| 3,805,595 | 4/1974 | Dobry .......................... 73/49.3 |
| 3,918,293 | 11/1975 | Feigel ............................. 73/52 |
| 3,998,091 | 12/1976 | Paquette et al. ............... 73/52 |
| 4,024,956 | 5/1977 | Cassidy .......................... 73/52 |
| 4,148,213 | 4/1979 | Prakken ...................... 73/45.4 |
| 4,305,691 | 12/1981 | Mayer .......................... 221/211 |
| 4,322,067 | 3/1982 | Masselin et al. ............. 221/211 |
| 4,510,730 | 4/1985 | Edmondson ................. 73/49.3 |
| 4,517,827 | 5/1985 | Tapscott ...................... 73/49.3 |

FOREIGN PATENT DOCUMENTS 2059381 4/1981 United Kingdom .
2113406 8/1983 United Kingdom ............... 73/52

Primary Examiner—Stewart J. Levy
Assistant Examiner—Hezron E. Williams
Attorney, Agent, or Firm—Solon B. Kemon

[57] ABSTRACT

Apparatus for testing for leaks in flexible packages containing a product such as potato crisps and some air comprises three probing stations. Packages are transferred from station to station by suction cup heads carried on a reciprocable beam. Probes incorporating weights are applied by gravity at each probing station under control of a support plate and cause air to be squeezed out of packages which have substantial leaks. Probe position sensing equipment detects when probes have dropped down and uses this information as an indication of a leak. The specification also describes apparatus for transferring packages to the leak testing apparatus.

5 Claims, 2 Drawing Figures

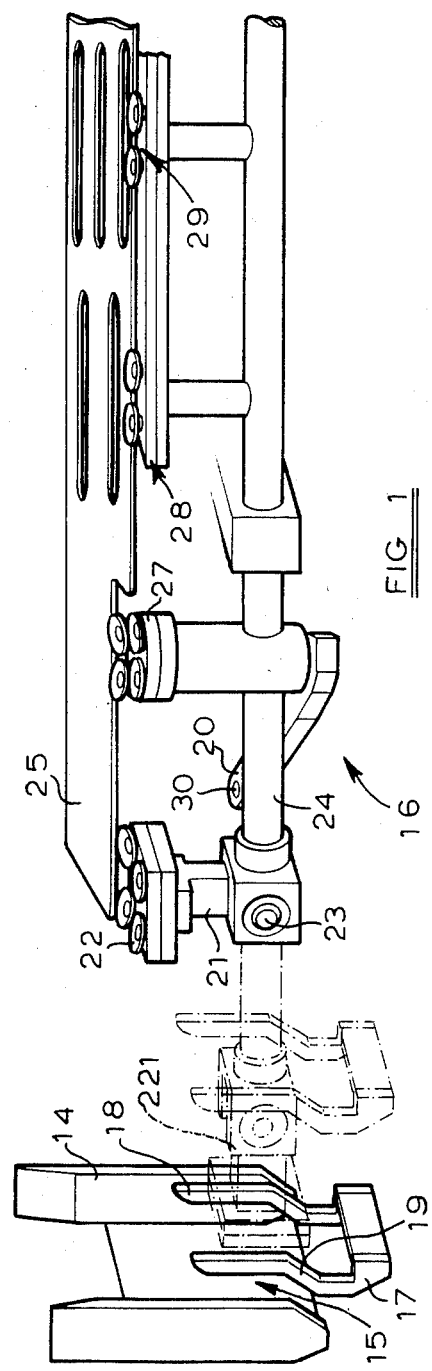

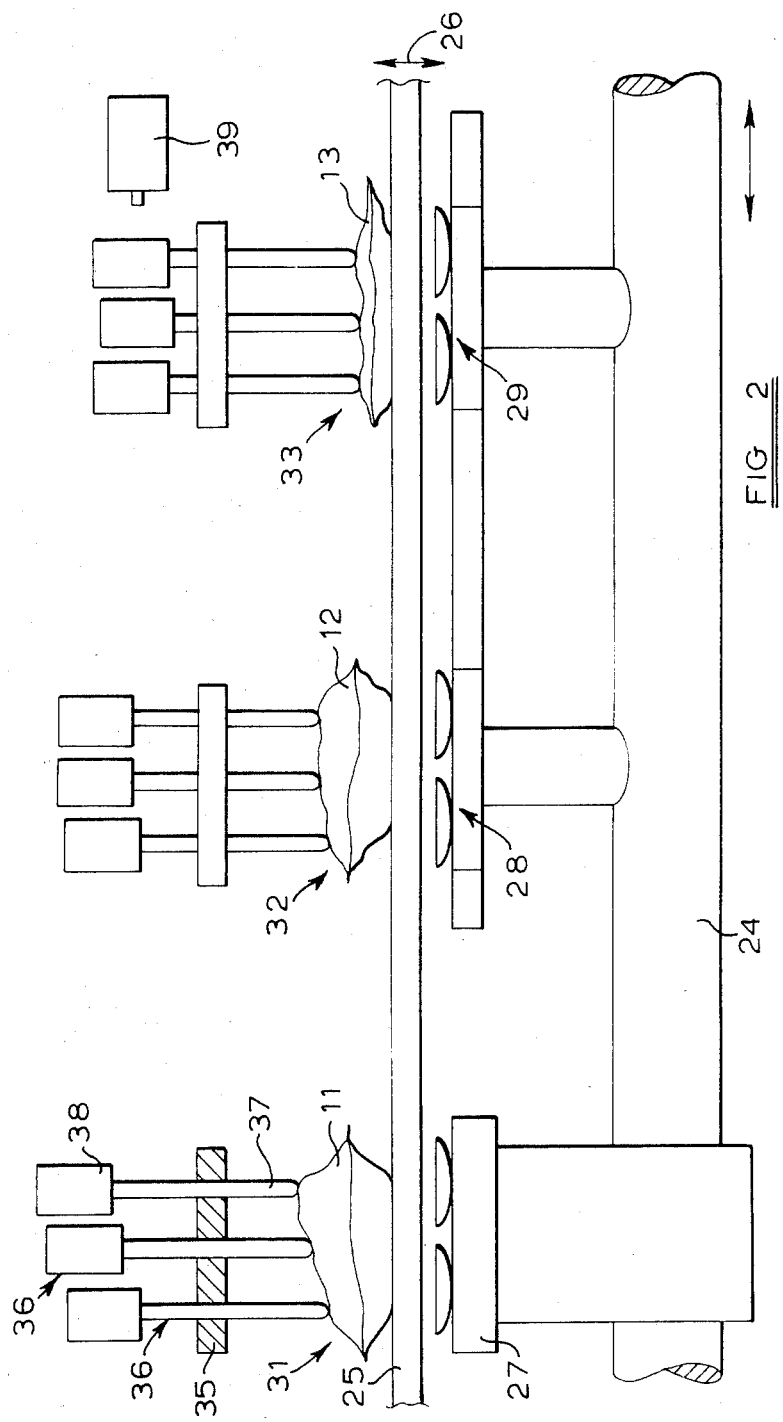

PACKAGE HANDLING APPARATUS AND METHOD

BACKGROUND OF THE INVENTION

The invention relates to package handling apparatus and in particular is concerned with apparatus for testing for leaks in a flexible package and to apparatus for transferring satisfactory packages to a conveyor whilst facilitating rejection of sub-standard packages.

The packages with which the invention is concerned are for example potato crisp packs in the form of a sealed bag having two opposite rectangular faces, the bag containing the potato crisps and also some air which tends to prevent undue collapse of the bag. Other kinds of products are packaged in similar bags and as will be evident, the invention could also be applied to packages for other products.

In the packaging of potato crisps, there is some tendency to produce empty or underfilled packages and to produce some packages which have an unacceptably large air leak, possibly by being ineffectively sealed or completely unclosed. These sub-standard packages tend to occur at random amongst satisfactory packages and if the packaging apparatus has to be stopped every time a sub-standard package is detected, the output of the packaging apparatus is reduced. It is also disadvantageous to fail to detect sub-standard packages because these can eventually lead to customer complaints.

An object of the present invention is to provide package handling apparatus which facilitates detection of unsatisfactory packages and which does this in such a way that the apparatus does not have to be stopped to clear away the sub-standard package.

SUMMARY OF THE INVENTION

According to one aspect of the invention there is provided apparatus for testing for leaks in a flexible package containing loosely packaged product and some air, comprising a support for one face of the package, a plurality of probes engageable against the opposite face of the package at points spread over the face with a pre-determined force and means for detecting whether the package has more than a pre-determined effective thickness after application of the probes by sensing whether any of the probes has approached too close to the support. The action of the probes tends to squeeze air out of the package if there is a substantial leak and this results in the close approach of one probe to the support.

Preferably there are at least two probing stations arranged in series at each of which each package is probed in turn and the means for detecting whether the package has sufficient thickness is associated with the last probing station. Successive probing activity helps to guard against the possibility that advance of the probes is held up by the product within the package rather than by air pressure because successive groups of probes should engage the package at slightly different positions.

The support may comprise open regions to allow air to escape from the support side of the packages and the positions of the open spaces may vary from one probing station to another whereby a leak at any one position in the support side of the passage coincides with an opening at at least one probing station. Preferably the probes are applied vertically and the support is a conveyor on which the packages lie. The conveyor then indexes the packages from one probing station to the next. The pre-determined force may be provided by the weight of the probes.

The invention also extends to a method of testing for leaks in a flexible package containing loosely packaged product and some air, the method comprising supporting one face of the package, applying probes simultaneously to points spread over the opposite face of the package with a pre-determined force and detecting whether the package has more than a pre-determined effective thickness after application of the probes by detecting whether any of the probes has moved too far towards the package. The application of probes may be repeated for a second and/or subsequent times before detection of whether the package has more than a pre-determined effective thickness.

According to a further aspect of the invention there is provided an apparatus for conveying packages to a conveyor and for facilitating rejection of sub-standard packages comprising a guide down which packages pass, a transfer station at the base of the guide defined by the guide and a movable support having spaced support fingers, a transfer arm arranged to swing upward and outward from a package collection position between the fingers to a package deposit position for depositing packages on the conveyor and means for retracting the movable support from the guide, both to facilitate regular transfer of a satisfactory package and to allow a sub-standard package to drop out from the base of the guide without being picked up by the transfer arm.

BRIEF DESCRIPTION OF THE DRAWINGS

An embodiment of the invention will now be described with reference to the accompanying drawings in which:

FIG. 1 is a perspective view showing the general layout of the apparatus; and

FIG. 2 is a diagrammatic side elevation of the part of the apparatus associated with testing for leaks.

DESCRIPTION OF A PREFERRED EMBODIMENT

The apparatus shown in FIGS. 1 and 2 is concerned particularly with the handling of packs of potato crisps as shown at 11, 12 and 13 in FIG. 2.

Referring particularly to FIG. 1, potato crisps are packaged into conventional two-faced rectangular packs containing some air as well as the crisps immediately above a vertical guide 14. Guide 14 terminates at its lower end in a transfer station 15 from which peaks are transferred one at a time to a conveyor 16 in a manner to be described subsequently. A movable support 17 with spaced fingers 18 is arranged to retract cyclically by guide means (not shown) from the position shown in full to the position shown in ghost. The part of the movable support 17 which defines the lower edge of the transfer station is two inclined portions 19 of fingers 18 and this inclination ensures that the movable support 17 can not in itself carry a package when it is removed from the guide 14.

A transfer arm 21 carries a series of suction cups 22 intended to grip a crisp pack when suction is applied to enable the transfer arm to carry the pack. The transfer arm is pivotted at 23 to a reciprocable beam 24 and has further guidance means (not shown) to ensure that during reciprocation between the vertical position shown in full and the horizontal position 221 shown in ghost, it swings as illustrated between the vertical and horizontal positions as well as reciprocating laterally.

Conveyor 16 incorporates a table 25 of which only one half is shown in FIG. 1. The table has a second half, which is a symmetrical mirror image of the first half on the opposite side of the conveyor axis represented by the axis of reciprocable beam 24. This second half of the table is removed from the drawing for purposes of clarity. In its vertical position, transfer arm 21 has its suction cups 22 in a gap between the two sides of the conveyor table 25 and this constitutes a deposit position for depositing packages on the conveyor. Table 25 can be raised and lowered as indicated by vertical arrow 26 in FIG. 2, and lifting of table 25 in conjunction with removal of suction from cups 22 lifts the pack of crisps clear of transfer arm 21 and completes transfer of the pack to the conveyor.

The position of the suction cups 22 in relation to the transfer station 15 is such that in the case of a badly malformed pack, for example an empty and completely unsealed pack which does not bulge out towards the suction cups 22 to the same extent as a normal pack, the suction cups do not engage with the pack and so do not transfer it away from the transfer station. Then, as the arm 21 is swung away from its position shown in ghost and guide 17 moves towards the position shown in ghost, thereby opening the lower end of the transfer station, the malformed pack drops away. Similarly unpacked or spilled crisps also drop clear of the apparatus.

As shown in both FIGS. 1 and 2, reciprocable beam 24 of conveyor 16 carries suction cup heads 27, 28 and 29 in addition to the transfer arm 21. These suction cup heads are all arranged with equal spacings between any one head and the next immediately adjacent head. The beam 24 is arranged to reciprociate back and forth through a fixed stroke equal to the spacing between an adjacent pair of suction cup heads. Packs of crisps are indexed along the conveyor 16 by reciprocating the beam 24 and thereby indexing the suction cup heads to the left in the drawings with the table 25 raised, lowering the table and applying suction to all the heads and so to support the packs on the suction cups, reciprocating the beam 24 back to its rightward position whilst carrying the packs and then redepositing the packs on the table by raising the table and removing the suction. Suction cup head 27 has an arm 20 with a cam peg 30 running in a groove (not shown) so that during reciprocation the head 27 rotates through 90° and thus swings each pack of crisps through 90° so that it is placed on the conveyor in the desired orientation.

Suction to all the suction cups is applied through passages (not shown) in the beam 24.

FIG. 2 shows three probing stations 31, 32 and 33 at each of which there is positioned a pack of crisps 11, 12, 13. The spacing between adjacent probing stations is equivalent to the spacing between adjacent suction cup heads and to the stroke through which beam 24 is arranged to reciprocate so that the packs are indexed by the conveyor between adjacent probing stations. A probing head is arranged at each probing station and the probing head at station 31 will be described in detail. The probing head comprises a support plate 35 which is arranged to be reciprocated up and down cyclically by means not shown and has nine probes 36 arranged in three rows of three probes in the support plate so that only three of the probes are shown. Each probe incorporates a plunger 37 which slides in a bore in the support plate 35 and has a rounded lower end so that it can engage the pack of crisps without damaging it. Each probe also carries a weight 38 which determines the downward force of each probe on the pack of crisps. On raising the support plate 35, weight 38 or another stop provided on each probe causes all the probes to be lifted up by the support plate so that all the probes are clear of a pack of crisps. On lowering the support plate, all the probes are applied to a pack of crisps directly under the probes with a force determined by the weight 38. All nine probes at each probing station are applied for a pre-determined period, sufficient to cause some air to be expelled from the pack if it has a significant leak. By utilising more than one probing station and passing the packs through each station in series, an opportunity is provided for the crisps to be shaken down and to prevent one or more awkwardly positioned crisps from holding the probe in a high position as suggested by the probe on the right at probing station 31. If desired four or even more probing stations may be provided in series. In FIG. 2, the two packs of crisps 11 and 12 are shown to have normal thickness, suggesting that they are both satisfactorily sealed although for pack 11 in particular, there is the possibility that it will deflate during further probing. FIG. 2 also shows pack 13 which has deflated due to the progressive action of probes at stations 31, 32 and 33 and clearly incorporates a leak. Probe position sensing equipment illustrated diagrammatically at 39 is provided at the probing station 33 to indicate whether the probes have moved down beyond the position such as that shown at station 32. Excessively low probes, as shown at station 33 are indicative of a sub-standard pack and in this case the pack 13 would be rejected automatically in response to a signal generated by the probe position sensing equipment 39.

Satisfactory packs of crisps are conveyed further along the system, for example to equipment for packing the packs into cartons.

As an alternative to raising and lowering support plates 35, the raising and lowering of table 25 may be used to bring the probes and packs into and out of engagement with each other. In such a case, the probe position sensing equipment causes rejection of a pack if one of the associated probes fails to lift sufficiently.

I claim:

1. Apparatus for testing for leaks in a flexible package containing loosely packaged product and some air, comprising a support for one face of the package the support comprising open regions to allow air to escape from a supported side of the package, a plurality of independently movable probes each for engagement against the opposite face of the package with a predetermined force at localized points spread over the face, means for moving a supported package and the probes into mutual engagement and means for detecting whether the package has more than a predetermined effective thickness after application of the probes by sensing whether any of the probes has approached too close to the support.

2. Apparatus according to claim 1 having at least two probing stations wherein the positions of the open regions vary from one station to another whereby a leak at any one position in the support side of the package coincides with an opening at at least one probing station.

3. Apparatus as claimed in claim 1 further comprising apparatus for conveying packages to a conveyor and for facilitating rejection of sub-standard packages and comprising a guide having a lower end and down which packages pass, a transfer station at the lower end of the guide defined by both the guide and a movable support having spaced support fingers, a transfer arm arranged to swing upward and outward from a package collection position between the fingers to a package deposit position for depositing packages on the conveyor and means for retracting the movable support from the guide, both to facilitate regular transfer of a satisfactory package and to allow a sub-standard package to drop out from the base of the guide without being picked up by the transfer arm, wherein the transfer arm is linked to mechanism which transfers packages from one probing station to the next such that the conveying of packages to the conveyor and the indexing of packages between probing stations occur in synchronism.

4. Apparatus for conveying packages to a conveyor and for facilitating rejection of sub-standard packages comprising a guide having a lower end and down which packages pass, a transfer station at the lower end of the guide defined by both the guide and a movable support having spaced support fingers, a transfer arm arranged to swing upward and outward from a package collection position between the fingers to a package deposit position for depositing packages on the conveyor and means for retracting the movable support from the guide, both to facilitate regular transfer of a satisfactory package and to allow a sub-standard package to drop out from the base of the guide without being picked up by the transfer arm.

5. Apparatus as claimed in claim 4 wherein the transfer arm carries suction cups for engagement with the package.

* * * * *